United States Patent
Zhang et al.

(10) Patent No.: US 8,948,449 B2
(45) Date of Patent: Feb. 3, 2015

(54) SELECTING VISIBLE REGIONS IN NIGHTTIME IMAGES FOR PERFORMING CLEAR PATH DETECTION

(75) Inventors: Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 13/366,420

(22) Filed: Feb. 6, 2012

(65) Prior Publication Data

US 2013/0202152 A1  Aug. 8, 2013

(51) Int. Cl.
*G06K 9/00*  (2006.01)

(52) U.S. Cl.
USPC ........... 382/103; 348/251; 348/143; 701/301; 382/104

(58) Field of Classification Search
None
See application file for complete search history.

(56) References Cited

U.S. PATENT DOCUMENTS

| | | | |
|---|---|---|---|
| 5,729,016 A * | 3/1998 | Klapper et al. | 250/334 |
| 6,327,522 B1 * | 12/2001 | Kojima et al. | 701/1 |
| 6,411,328 B1 * | 6/2002 | Franke et al. | 348/149 |
| 6,420,704 B1 * | 7/2002 | Berenz et al. | 250/330 |
| 6,421,463 B1 * | 7/2002 | Poggio et al. | 382/224 |
| 6,611,618 B1 * | 8/2003 | Peli | 382/154 |
| 6,751,342 B2 * | 6/2004 | Shepard | 382/141 |
| 6,823,241 B2 * | 11/2004 | Shirato et al. | 701/1 |
| 7,068,842 B2 * | 6/2006 | Liang et al. | 382/181 |
| 7,130,486 B2 * | 10/2006 | Eggers et al. | 382/274 |
| 7,139,411 B2 * | 11/2006 | Fujimura et al. | 382/103 |
| 7,209,588 B2 * | 4/2007 | Liang et al. | 382/181 |
| 7,302,110 B2 * | 11/2007 | Chesnokov | 382/264 |
| 7,319,805 B2 * | 1/2008 | Remillard et al. | 385/147 |
| 7,366,325 B2 * | 4/2008 | Fujimura et al. | 382/104 |
| 7,602,942 B2 * | 10/2009 | Bazakos et al. | 382/103 |
| 7,633,406 B2 * | 12/2009 | Miki | 340/9.1 |
| 7,646,884 B2 * | 1/2010 | Remillard et al. | 382/100 |
| 8,164,543 B2 * | 4/2012 | Seder et al. | 345/7 |
| 8,294,794 B2 * | 10/2012 | Zhang et al. | 348/251 |
| 8,395,674 B2 * | 3/2013 | Yilmaz et al. | 348/222.1 |
| 2003/0095080 A1 * | 5/2003 | Colmenarez et al. | 345/7 |
| 2004/0175034 A1 * | 9/2004 | Wiemker et al. | 382/173 |
| 2004/0183679 A1 * | 9/2004 | Paximadis et al. | 340/567 |
| 2005/0058323 A1 * | 3/2005 | Brodsky | 382/104 |
| 2006/0177097 A1 * | 8/2006 | Fujimura et al. | 382/103 |

(Continued)

OTHER PUBLICATIONS

Savran et al., Regression-based intensity estimation of facial action units, Nov. 27, 2011, Image and Vision Computing 30 (2012) 774-784.*

*Primary Examiner* — Chan Park
*Assistant Examiner* — Iman K Kholdebarin

(57) ABSTRACT

A method provides for determining visible regions in a captured image during a nighttime lighting condition. An image is captured from an image capture device mounted to a vehicle. An intensity histogram of the captured image is generated. An intensity threshold is applied to the intensity histogram for identifying visible candidate regions of a path of travel. The intensity threshold is determined from a training technique that utilizes a plurality of training-based captured images of various scenes. An objective function is used to determine objective function values for each correlating intensity value of each training-based captured image. The objective function values and associated intensity values for each of the training-based captured images are processed for identifying a minimum objective function value and associated optimum intensity threshold for identifying the visible candidate regions of the captured image.

21 Claims, 11 Drawing Sheets

(56) References Cited

U.S. PATENT DOCUMENTS

| | | | |
|---|---|---|---|
| 2007/0211482 A1* | 9/2007 | Rebut | 362/466 |
| 2008/0199045 A1* | 8/2008 | Ekin | 382/104 |
| 2008/0285853 A1* | 11/2008 | Bressan | 382/169 |
| 2008/0310742 A1* | 12/2008 | Kostrzewski et al. | 382/236 |
| 2009/0268948 A1* | 10/2009 | Zhang et al. | 382/104 |
| 2009/0295917 A1* | 12/2009 | Zhang et al. | 348/119 |
| 2010/0098295 A1* | 4/2010 | Zhang et al. | 382/103 |
| 2010/0098297 A1* | 4/2010 | Zhang | 382/104 |
| 2010/0104137 A1* | 4/2010 | Zhang et al. | 382/104 |
| 2010/0121577 A1* | 5/2010 | Zhang et al. | 701/301 |
| 2010/0245608 A1* | 9/2010 | Trudeau et al. | 348/222.1 |
| 2010/0284626 A1* | 11/2010 | Malm et al. | 382/261 |
| 2011/0007946 A1* | 1/2011 | Liang et al. | 382/103 |
| 2012/0008019 A1* | 1/2012 | Zhang et al. | 348/251 |
| 2012/0008020 A1* | 1/2012 | Zhang et al. | 348/251 |
| 2012/0008021 A1* | 1/2012 | Zhang et al. | 348/251 |
| 2012/0224060 A1* | 9/2012 | Gurevich et al. | 348/148 |
| 2012/0229643 A1* | 9/2012 | Chidanand et al. | 348/148 |
| 2013/0064449 A1* | 3/2013 | Menikoff | 382/168 |
| 2014/0176724 A1* | 6/2014 | Zhang et al. | 348/164 |
| 2014/0233862 A1* | 8/2014 | Pack | 382/274 |

* cited by examiner

SELECTING VISIBLE REGIONS IN NIGHTTIME IMAGES FOR PERFORMING CLEAR PATH DETECTION

BACKGROUND OF INVENTION

An embodiment relates generally to road recognition.

Vision-imaging systems are used in vehicles for enhancing sensing applications within the vehicle such as clear path detection systems, object detection systems, and other vision/positioning systems. Such systems utilize a camera to capture the image. For an image captured during a nighttime lighting condition, a path of travel may not be readily distinguishable from non-road and other unidentified regions of captured image utilizing the vision-based capture system that may be due to insufficient illumination. If the vision-based camera system cannot distinguish between the road of travel and non-road of travel, then secondary systems that utilize the captured image information become ineffective.

SUMMARY OF INVENTION

An advantage of an embodiment is determination of a visible region of travel utilizing by selecting a modeling technique that provides the least error among alternative techniques. The method utilizes training images for identifying an objective function that is representative of identifying a visible region from all training images. The identified visible regions are utilized for detecting a clear path. Based on the objective function, an objective function value-intensity correlation graph is generated. The correlation graph is used by a plurality of modeling techniques for determining which technique will produce an intensity threshold with the least error among the alternatives. The threshold will be used on captured images when the system is utilized in a real-time environment for identifying visible regions.

An embodiment contemplates a method of determining visible regions in a captured image during a nighttime lighting condition. An image is captured from an image capture device mounted to a vehicle. An intensity histogram of the captured image is generated. An intensity threshold is applied to the intensity histogram for identifying visible candidate regions of a path of travel. The intensity threshold is determined from a training technique that utilizes a plurality of training-based captured images of various scenes. An objective function is used to determine objective function values for each correlating intensity value of each training-based captured image. The objective function values and associated intensity values for each of the training-based captured images are processed for identifying a minimum objective function value and associated optimum intensity threshold for identifying the visible candidate regions of the captured image.

DETAILED DESCRIPTION

There is shown a block diagram of an imaging capture system used in a vehicle 10 for performing clear path detection at night. The vehicle includes an image capture device 11, a vision processing unit 12, and an output application 13.

The image capture device 11 includes a camera or video camera which images of the environment exterior of the vehicle 10 are obtained and stored for processing. The image capture device 11 is mounted on the vehicle so that the desired region along the path of travel is captured. Preferably, the image capture device 11 is mounted just behind the front windshield for capturing events occurring exterior and forward of the vehicle; however, the image capture device may be mounted at any other location suitable for capturing images. The image capture device 11 is part of an existing system in the vehicle that is typically used for recognition of road marking, lane markings, road signs, or other roadway objects used in lane departure warning systems and clear path detection systems. The captured images from the image capture device 11 are also used to distinguish between a daytime lighting condition and a nighttime lighting condition.

The vision processing unit 12 receives the images captured by the image capture device 11 and analyzes the images for identifying a visible region in the path of travel of the vehicle 10. The visible region may be used to determine clear path, pedestrian objects, or other obstructions. Details of the processing and analyzing the captured images will be discussed in detail herein. An output application 13 includes any device or application that utilizes the identified visible region in the path of travel for enhancing the driver's awareness to the clear path of travel or other applications that utilize the clear path to assist the driver with nighttime enhancement operations. For example, the output application 13 may be a warning system that notifies the driver of an object in the path of travel.

The system utilizes the vision processing unit 12 for determining a visible region in the image during a nighttime condition. A training technique is executed for determining an intensity threshold that can be applied to the captured image for identifying those pixels of the image that represent a visible region. After the threshold is identified, the intensity threshold is applied to an intensity histogram representing the captured image for identifying the visible region in the image.

Figure 1:
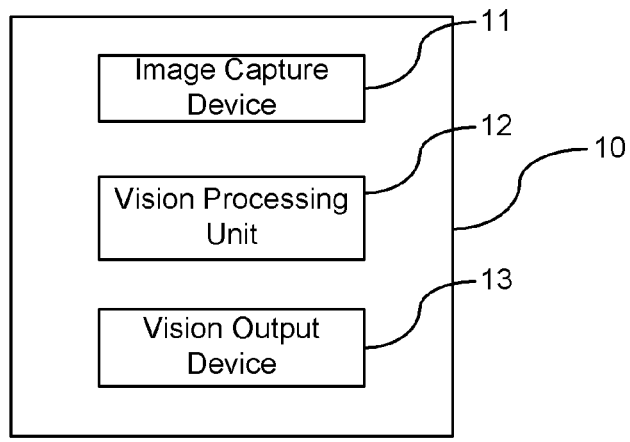
FIG. 1 is a block diagram of an imaging capture system in a vehicle.
Figure 2:
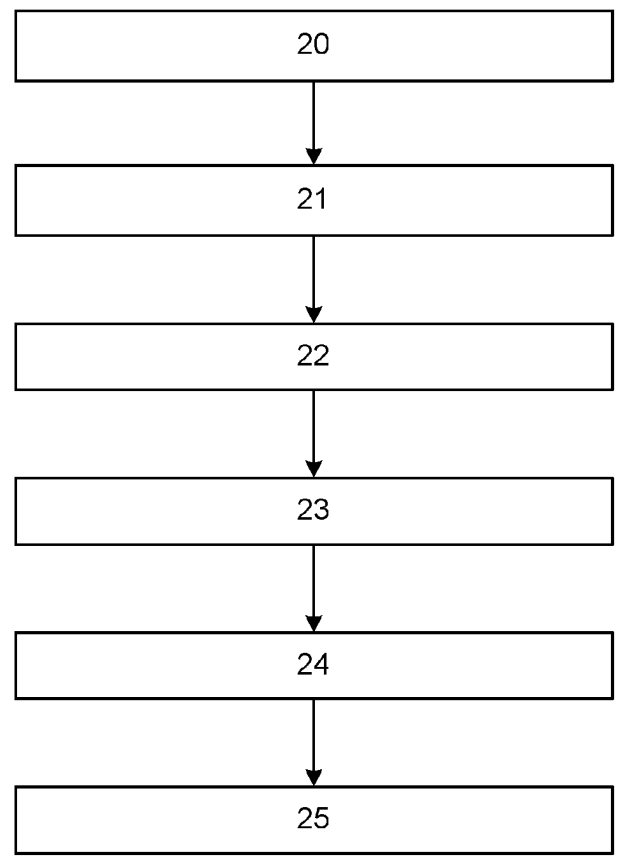
FIG. 2 is a flowchart of a method for identifying a visible region of a path of travel.
Figure 3:
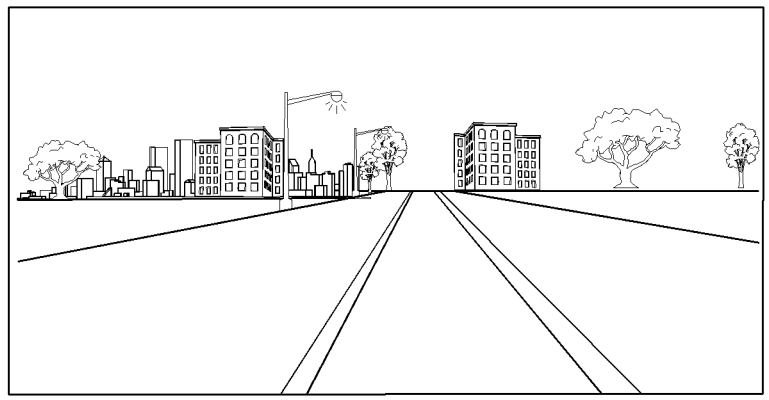
FIG. 3 is an exemplary image captured by the vision-based imaging system.

FIG. 2 illustrates a flowchart for identifying the visible region of the path of travel for a captured image. In step 20, an image is captured by the capture image device of an environment exterior of the vehicle. FIG. 3 illustrates an exemplary image captured by the vision-based imaging system. The image is shown in clarity for illustrating objects in the image; however, typically an image captured during a nighttime would have visible and non-visible regions. A region of interest is selected within the image for analyzing the lighting condition. If a nighttime condition is determined by the vision imaging system, then the routine proceeds to step 21 for determining the visible region in the path of travel.

Figure 4:
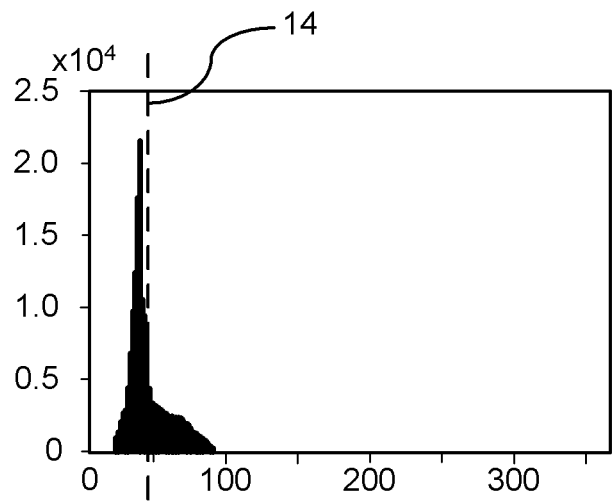
FIG. 4 is an exemplary intensity histogram for a captured image.

In step 21, an intensity histogram of the captured image is generated. FIG. 4 illustrates an example of an intensity histogram. The x-axis represents the intensity value, and the y-axis represents the number of the pixels for each pixel intensity value in an image. The region of interest of a respective image is analyzed. The histogram is generated based on the intensity of each of the plurality of pixels. Each pixel within the region of interest has an associated intensity value. Each of the intensity values of the image are represented within the histogram.

In step 22, an intensity threshold is applied to the intensity histogram for identifying those intensity values associated with a visible region of the captured image. For example, in FIG. 4, the intensity threshold is represented by threshold line 14. The intensity values greater than the threshold line 14 are designated as pixels that represent the visible region. The intensity values smaller than the threshold line 14 are not considered part of the visible region.

Figure 5:
FIG. 5 is an exemplary image illustrating a determined candidate visible region by applying the identified intensity threshold.

In step 23, a candidate visible region is identified within the captured image. FIG. 5 illustrates a candidate visible region of the captured image as determined by technique described herein. The darkened regions illustrate the visible candidate region of the image as identified by the intensity values of the pixels being greater than the intensity threshold value.

Figure 6:
FIG. 6 is the candidate visible region after morphological smoothing.

In step 24, smoothing is applied to the candidate visible region. The smoothing operation may include open and close smoothing operations. Any known smoothing operation may be utilized for identifying the smoothed visible region from the candidate region. Opening and closing morphological smoothing may be cooperatively applied where opening smoothes the targeted region internally and closing smoothes the targeted region externally. Open operations smooth the targeted region by eliminating narrowing sections that connects larger sections, eliminates small protrusions such as corners, and generates new gaps. Closing operations smooth the targeted region by fusing narrow breaks between large areas of the targeted region and fills gaps in the targeted region. FIG. 6 illustrates the morphological smoothing operation applied to the candidate visible region of FIG. 5.

In step 25, illumination normalization is performed for enhancing the contrast of the image for better image classification.

Figure 7:
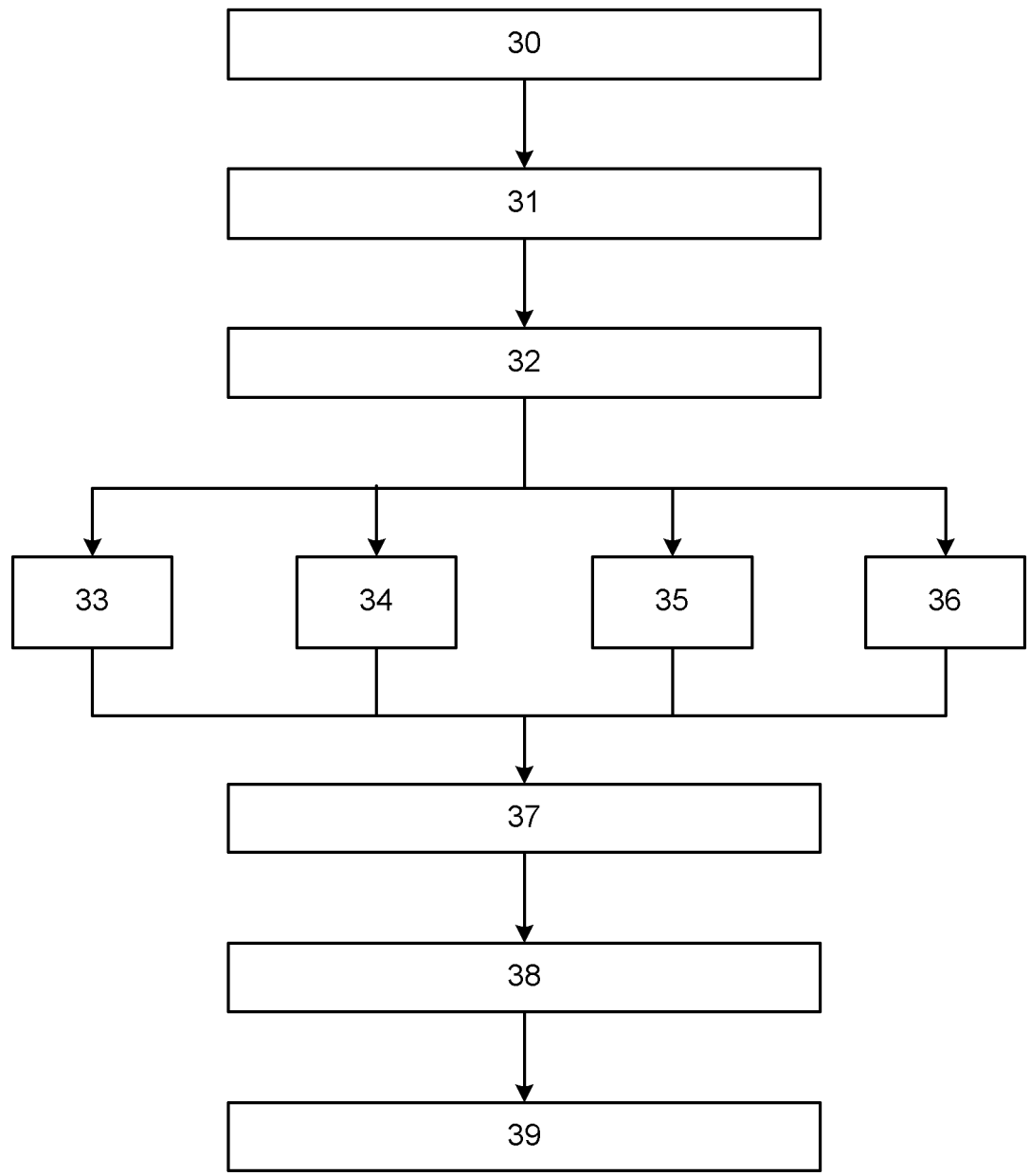
FIG. 7 is a training technique for determining an intensity threshold to apply to a captured image.

FIG. 7 illustrates a training technique for determining the intensity threshold applied to the capture image.

In step 30, a plurality of training-based images is captured by an image capture device during a night time condition. The training-based images represent various scenes from different nighttime lighting conditions and locations.

In step 31, an objective function is generated that is used in determining an intensity threshold for identifying a visible region in an image captured from an image capture device. The objective function is generated in a training phase. The objective function is formulated based on observations of training-based captured images. The observations may be that of an observer analyzing the images and applying a ground-truth labeling to the captured images. An example of ground truth labeling may include labeling regions of a training image as a road label region, a non-road label region, and an un-labeled region.

Figure 8:
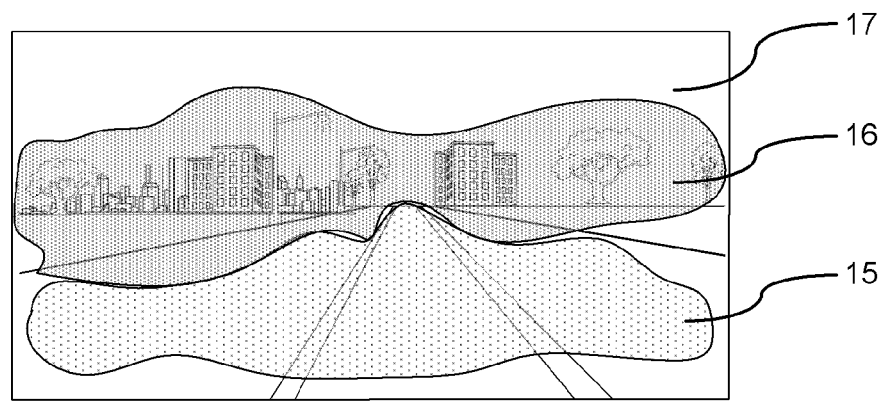
FIG. 8 is an example of ground truth labeling image.

FIG. 8 illustrates an example of ground truth labeling based on observations. The region designated as a road label is represented generally by 15, a non-road label is represented generally by 16, and the remaining regions which are designated as un-labeled are represented by 17. Based on the logic observations of the image in FIG. 8 and observations of other images, an objective function is generated that can be used for determining a night-time visibility threshold estimation. An exemplary formula based on the logic observation in FIG. 8.

$$f(x = w_1 \cdot (1 - \mathrm{rd}_{vis}(x)) + w_2 \cdot (1 - \mathrm{unL}_{vis}(x)) + w_3 \cdot \mathrm{grdmag}_{invis}(x) \qquad \text{eq. (1)}$$

where x is the intensity threshold of the visible region of interest in the sampled nighttime captured images, $\mathrm{rd}_{vis}$ is the ratio of labeled road areas in a visible region of interest in the sampled captured images over a total labeled region in the sampled nighttime captured images, $\mathrm{unL}_{vis}$ is the ratio of unlabeled areas classified as being invisible over a total unlabeled region area in the sampled nighttime captured images, $\mathrm{grdmag}_{invis}$ is a sum of a gradient magnitude in the invisible region, and w is the weights of each component in the objective function.

Based on the determined objective function, an optimal intensity value threshold may be identified utilizing the generated objective function.

In step 32, an intensity threshold identification process is initiated for minimizing objective values generated by the objective function. Various threshold identification techniques may be utilized for generating the intensity value threshold based on the training-based images. An intensity threshold and corresponding mean squared error associated with the respective result is calculated for each technique. The various methods are represented generally by steps 33-36. It should be understood that more or less techniques as described herein may be utilized. Each of these respective techniques will be described in detail later.

In step 37, the mean squared error calculated from each of the techniques in steps 33-36 are compared for identifying the technique producing the lowest mean squared error.

In step 38, the optimal intensity value threshold associated with the lowest mean square error is selected.

In step 39, the intensity value threshold selected in step 38 is used to identify the visible region in the captured image. That is, for a respective imaging system, once calibrated and placed into production within a vehicle or other environment, the selected intensity threshold is applied to an intensity histogram generated for any night-time image captured by the vehicle image capture device for identifying those respective intensity values representing the visible region in the captured image. The visible region is thereafter utilized for detecting a clear path in the path of travel of the vehicle. An example of the histogram is shown in FIG. 4. The respective intensity values greater than the intensity threshold 14 represent those image pixels associated with the visible region of the captured image.

Figure 9:
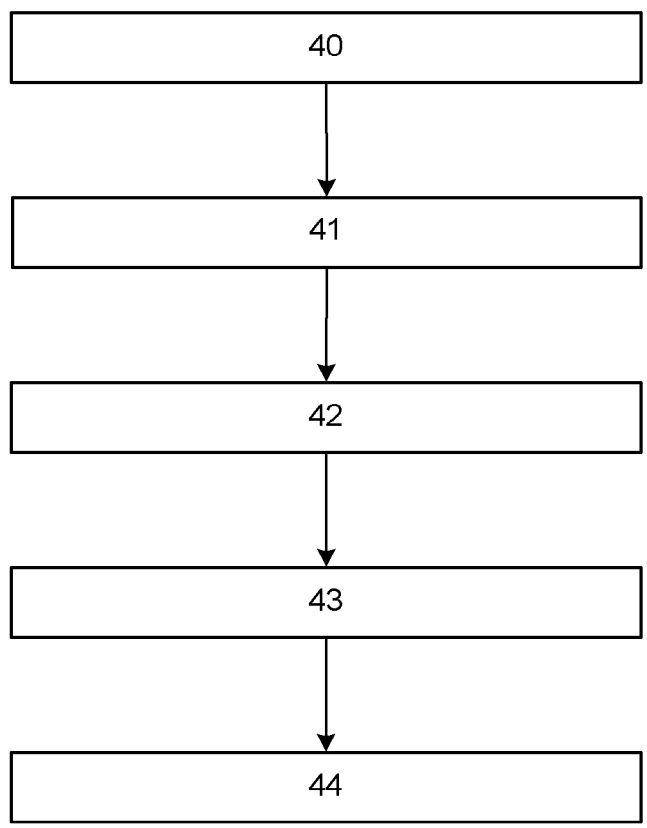
FIG. 9 is a flowchart of a method for identifying an intensity threshold based on a fixed intensity threshold technique.

FIG. 9 illustrates a flowchart of a first method (as represented by step 33 in FIG. 7) for identifying the intensity threshold. The method illustrated in FIG. 9 identifies the intensity threshold utilizing a fixed intensity threshold technique for all training-based images.

Figure 10:
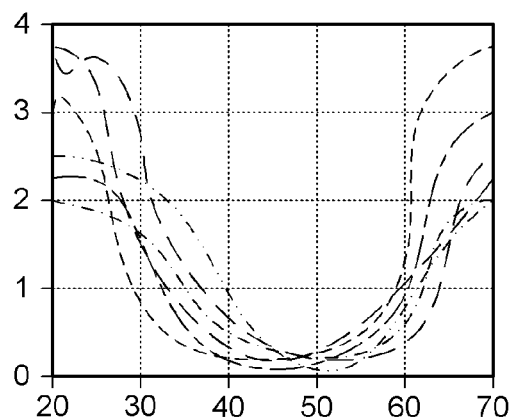
FIG. 10 is an example of an objective function value-intensity value correlation graph.

In step 40, an objective function value-intensity value correlation graph is generated for all training images utilizing the objective function. An exemplary plot is illustrated in FIG. 10. As a result, each plotted line represents a respective image. Each plotted line is comprised of objective function values calculated from the objective function values and the intensity values of each respective image. The x-axis designates the intensity values and the y-axis designates the objective function values.

In step 41, the objective function values for each correlating intensity value are summed for generating a summed objective function value plotted line. That is, for a respective intensity value illustrated in FIG. 10, each of the function values of all the images for the respective intensity value is summed. The resulting plot is illustrated in FIG. 11.

Figure 11:
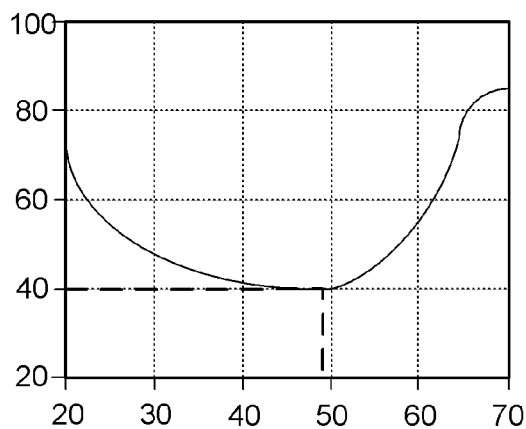
FIG. 11 is an example of a summed objective function value graph.

In step 42, the minimum objective function value is identified as the lowest of the summed objective function values shown in FIG. 11.

In step 43, the intensity value threshold (e.g., 48) is identified as the intensity value associated with the identified minimum objective function value. In addition to identifying the intensity value threshold from the graphs, the intensity value threshold may be determined by the following formula:

$$I_{thr\_fix} = \mathrm{argmin}\left(\sum_{s=1}^{N} f(x, s)\right) \qquad \text{eq. (2)}$$

where s is a respective image and f(x, s) are the objective function values for an associated image and intensity value.

In step 44, a mean squared error based on the fixed intensity threshold technique is determined. For the fixed intensity threshold technique described herein, the mean squared error may be determined by the following formula:

$$MSE_I = \sum_{s=1}^{N} (I(s) - I_{thr\_fix})^2 / N. \qquad \text{eq. (3)}$$

The mean square error is compared to the mean squared errors determined from other techniques (generated in steps 33-36 of FIG. 7) for determining which training technique to use.

Figure 12:
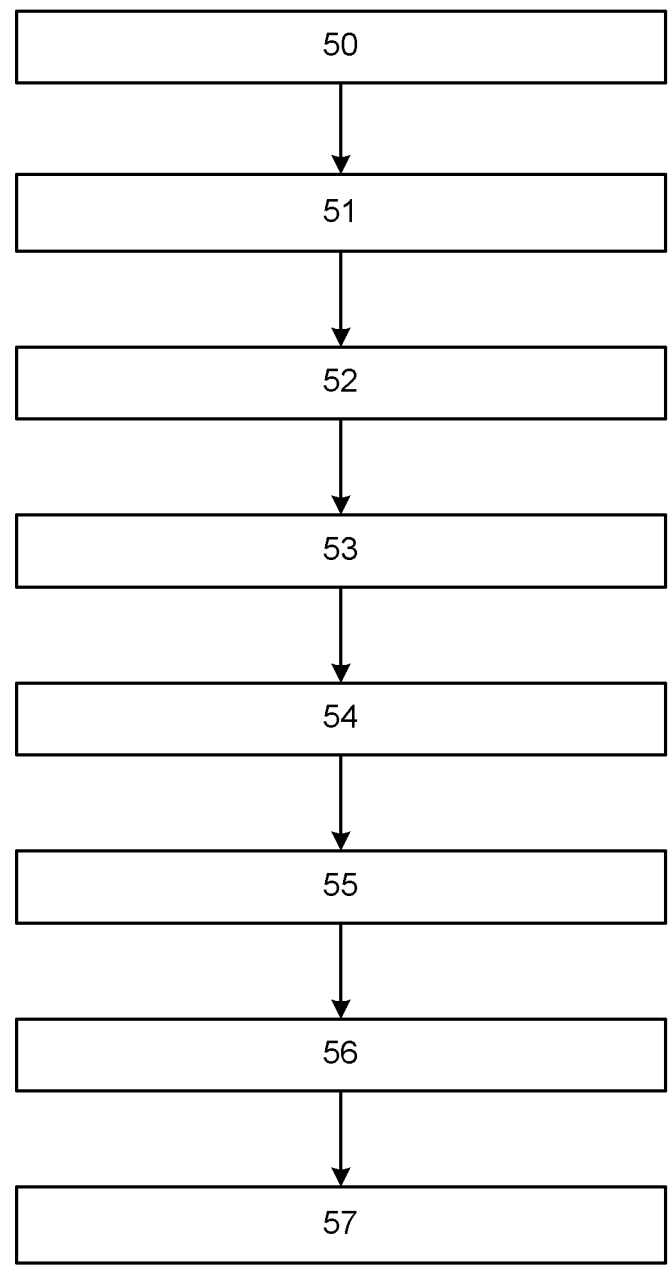
FIG. 12 is a flowchart of a method for identifying an intensity threshold based on a fixed intensity percentage technique.

FIG. 12 illustrates a flowchart of a second method (as represented by step 34 in FIG. 7) for identifying intensity threshold. The second method utilizes a fixed intensity percentage technique.

In step 50, the objective function value-intensity correlation graph is generated for all training-based images utilizing the objective function shown in eq. (1). It should be understood that the objective function value-intensity correlation graph will be the same for each technique since each of the methods utilize the same objective function and training images.

Figure 13:
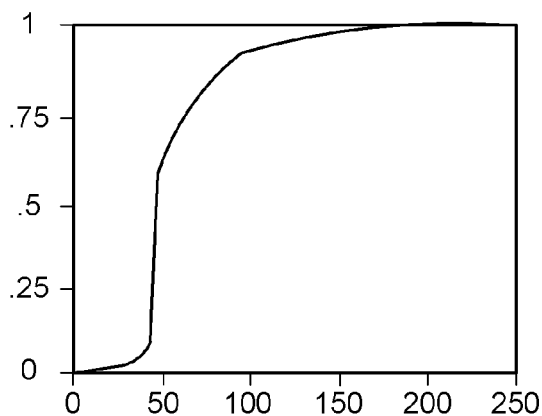
FIG. 13 is an example of a cumulative intensity histogram of a training image.

In step 51, a cumulative intensity histogram is generated for each training-based captured image. An example of a cumulative histogram is illustrated in FIG. 13. The cumulative intensity histogram illustrates the cumulative percentage of the intensity values of the pixels within a respective image. The x-axis represents intensity values and the y-axis represents a cumulative percentage.

Figure 14:
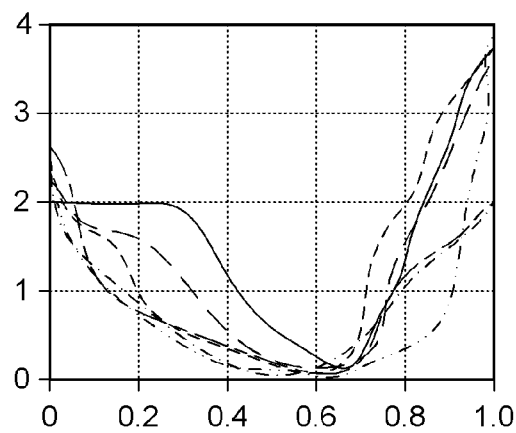
FIG. 14 is an example of an objective function value-percentage based intensity correlation graph.

In step 52, an objective function value-percentage based intensity correlation chart is generated for each training-based image. An example of the correlation chart is illustrated in FIG. 14. The correlation chart identifies each percentage-based intensity value in each image with a respective objective function value. The x-axis represents the percentage of the intensity values and the y-axis represents the objective function values.

Figure 15:
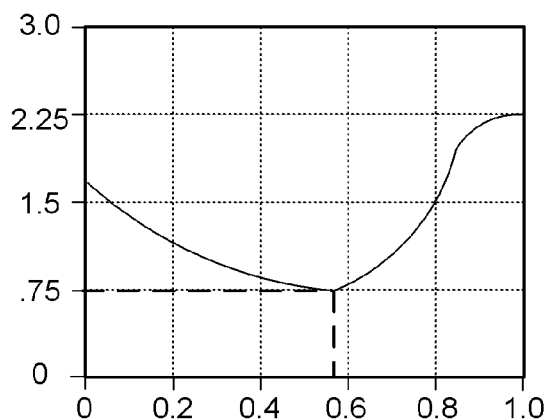
FIG. 15 is an averaged objective function value-percentage based intensity correlation graph.

In step 53, the objective function values associated with each percentage-based intensity value are averaged for generating an averaged objective function value plot line. That is, for a respective percentage-based intensity value illustrated in FIG. 14, each of the objective function values of all the images for the respective percentage based intensity values is averaged. The resulting plot is illustrated in FIG. 15. The x-axis represents the percentage of intensity values and the y-axis represents averaged objective function values.

In step 54, the minimum objective function value is identified from the averaged objective function values. The minimum objective function value is the lowest of the averaged objective function values (e.g. 0.75).

In step 55, the respective percentage-based intensity value is determined. The percentage-based intensity value (e.g., 0.58) is the intensity value associated with the minimum objective function value identified in step 54.

Figure 16:
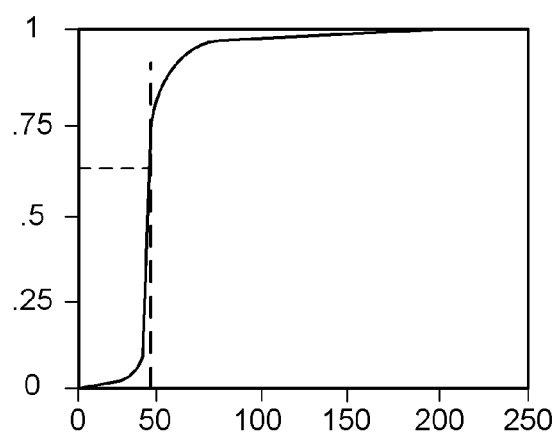
FIG. 16 is a cumulative intensity histogram of a captured image.

In step 56, a captured image is obtained from the capture image device. A cumulative intensity histogram is generated for the captured image as shown in FIG. 16. The x-axis represents intensity values and the y-axis represents the percentage-based intensity value. The percentage-based intensity value identified in step 55 is used to identify the intensity threshold. Utilizing the plotted curve (i.e., cumulative intensity histogram), an associated intensity threshold (e.g., 48) is identified for the associated percentage-based intensity value (e.g., 0.58). As an alternative to identifying the intensity threshold from correlation graph as illustrated, the intensity value threshold may be determined by the following formula:

$$R_{thr\_fix} = \mathrm{argmin}\left(\sum_{s=1}^{N} f(h_s^{-1}(r), s)\right) \qquad \text{eq. (4)}$$

where s is a respective image, and $f(h_x^{-1}(r),s)$ is the objective function values based on the percent-based intensity values.

In step 57, the mean squared error is determined based on the data from the fixed intensity percentage technique. For the fixed intensity percentage technique described herein, the mean square error may be determined by the following formula:

$$MSE_I = \sum_{s=1}^{N} \left(I(s) - h_s^{-1}(R_{thr\_fix})\right)^2 / N. \qquad \text{eq. (5)}$$

The mean square error is compared to the mean squared errors determined from other techniques (generated in steps 33-36 of FIG. 7) for determining which training technique to use.

Figure 17:
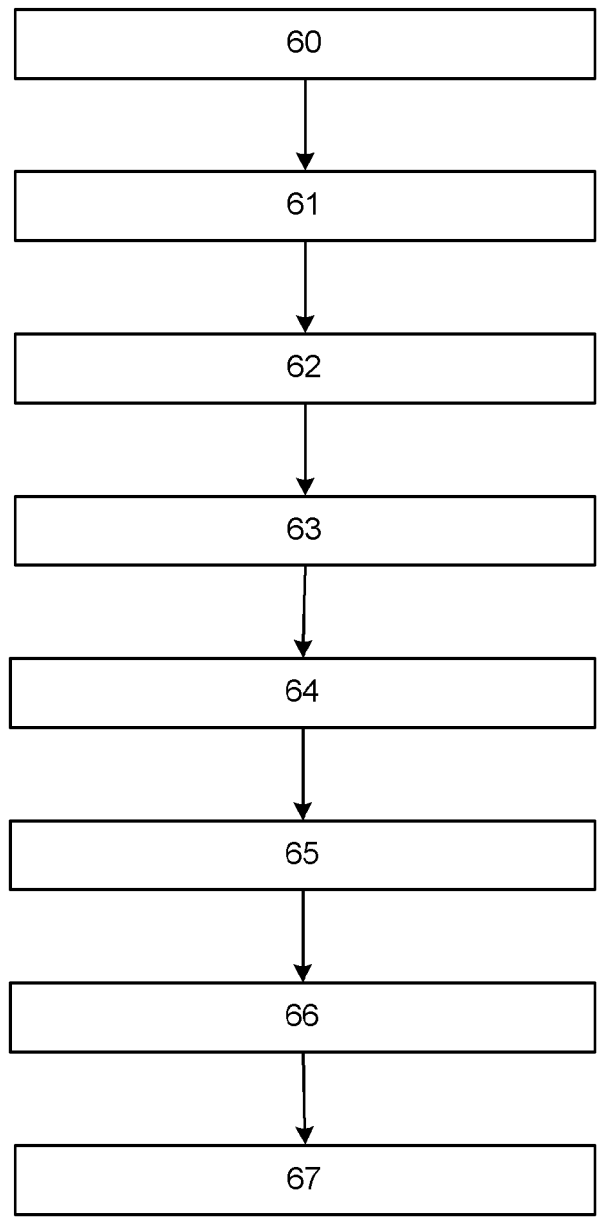
FIG. 17 is a flowchart of a method for identifying an intensity threshold based on an intensity threshold regression-based technique.

FIG. 17 illustrates a flowchart of a third method (as represented by step 35 in FIG. 7) for identifying intensity threshold. The third method utilizes an intensity threshold regression-based technique for all training-based images.

In step 60, an objective function value-intensity value correlation graph is provided for all training images utilizing the objective function as shown in eq. (1). The objective function value-intensity correlation graph is the same graph utilized for each technique since each of the methods utilizes the same objective function and training images.

Figure 18:
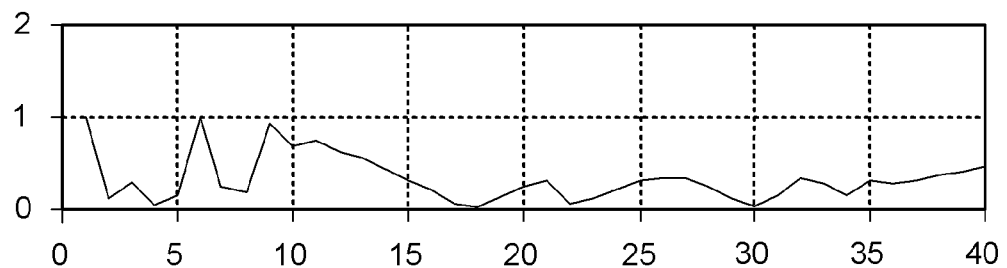
FIG. 18 is an exemplary graph illustrating the minimum objective function value for each training image.

In step 61, a minimum objective function value is identified for each training image. An exemplary graph illustrating the minimum objective function value for each training image is shown in FIG. 18. The x-axis represents the respective training image and the y-axis represents the objective function value.

Figure 19:
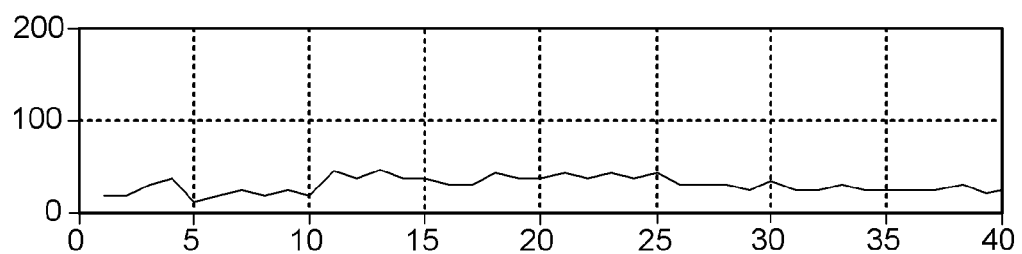
FIG. 19 is an exemplary graph illustrating the intensity threshold value for each training image.

In step 62, the intensity value associated with each minimum objective function value is determined. An exemplary graph illustrating the intensity value for each training image is shown in FIG. 19. The x-axis represents the respective training image and the y-axis represents the intensity value.

In step 63, regression parameters are determined for the regression analysis in the training phase. The intensity regression-based threshold may be determined by the following formula:

$$I_{thr\_reg}(s) = a_0 + \sum_{m=1}^{M} a_m \cdot cumh(m, s) \qquad \text{eq. (6)}$$

wherein $a_0$ is an initial parameter specific to the respective modeling technique determined during the training technique, $a_m$ is parameter specific to the respective modeling technique for a respective bin determined during the training technique, and cumh(m, s) is a cumulative intensity histogram at Bin m for the training image s. The parameters $a_0$-$a_M$ may be determined based on the known intensity threshold and the cumulative histograms of each training image. That is, based on the ground truth labeling set forth in eq. (1), the intensity threshold is known and the cumulative intensity histogram cumh(m, s) is known for each training image. Therefore, for at least M+1 training images with the associated cumulative intensity histograms as inputs, at least M+1 regression equations with the intensity thresholds as outputs could be identified with M+1 unknown parameters $a_0$-$a_M$. Therefore, parameters $a_0$-$a_M$ may be solved for. Moreover, the M+1 identifier may be used to designate the number of bins. If for example, M+1 is equal to eight, then eight bins are utilized in cumulative intensity histogram. It should be understood that the eight bins are exemplary and the number designated as M+1 may be more or less than eight.

In step 64, a mean squared error is determined for each regression technique applied as a function of the known objective function value, of the respective cumulative intensity histogram for each respective training image utilized, and of the determined parameters $a_0$-$a_M$.

In step 65, the regression technique having the lowest mean square error is identified.

In step 66, a cumulative histogram for the captured image is generated.

In step 67, the cumulative intensity histogram cumh(m, s) and parameters determined from the training session $a_0$-$a_M$ are used to solve for the intensity threshold.

Figure 20:
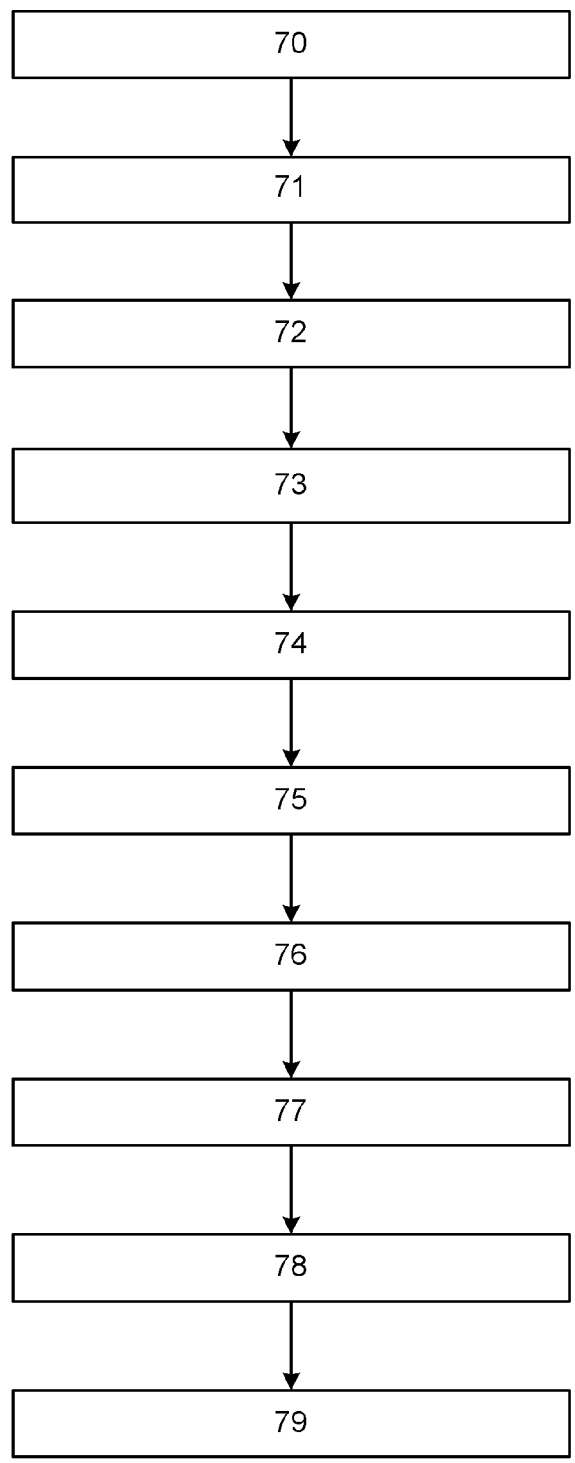
FIG. 20 is a flowchart of a method for identifying the intensity threshold based on an intensity percentage regression-based technique.

FIG. 20 illustrates a flowchart of a fourth method (as represented by step 36 in FIG. 7) for identifying intensity threshold. The fourth method utilizes an intensity percentage regression-based technique.

In step 70, an objective function value-intensity value correlation graph is provided for all training images utilizing the objective function as shown in eq. (1). The objective function value-intensity correlation graph is the same graphs utilized for each technique since each of the methods utilize the same objective function and training images.

In step 71, an objective function value-percentage-based correlation graph is generated based on the objective function value-intensity value correlation graph.

In step 72, a minimum objective function value is identified for each training image. An exemplary graph illustrating the minimum objective function value for each training image is shown in FIG. 18.

Figure 21:
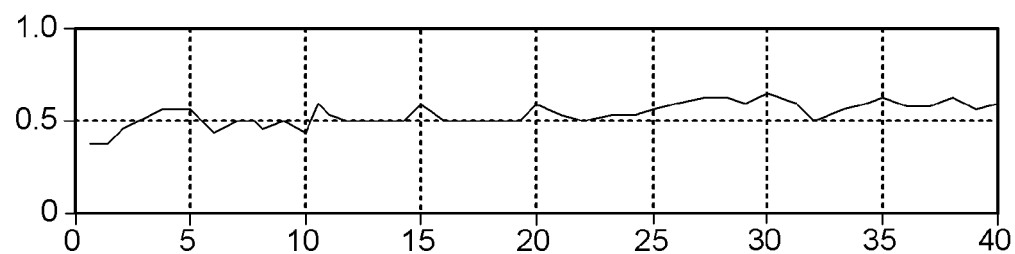
FIG. 21 is an exemplary graph illustrating the intensity percentage value for each training image.

In step 73, the intensity percentage value associated with each minimum objective function value is determined. An exemplary graph illustrating the intensity percentage value for each training image is shown in FIG. 21. The x-axis represents the respective training image and the y-axis represents the intensity percentage value.

In step 74, regression parameters are determined for the regression analysis in the training phase. The regression-based intensity percentage may be determined by the following formula:

$$R_{thr\_reg}(s) = b_0 + \sum_{m=1}^{M} b_m \cdot cumh(m, s) \qquad \text{eq. (8)}$$

wherein $b_0$ is an initial parameter specific to the respective modeling technique determined during the training technique, $b_m$ is parameter specific to the respective modeling technique for a respective bin determined during the training technique, and cumh(m, s) is a cumulative intensity histogram at Bin m for the training image s. The parameters $b_0$-$b_M$ may be determined based on the known intensity threshold (to get the known intensity percentage threshold) and the cumulative histograms of each training image. That is, based on the ground truth labeling set forth in eq. (1), the percentage-based intensity threshold is determined from the known intensity threshold. Moreover, the cumulative intensity histogram cumh(m, s) is known for each training image. Therefore, for at least M+1 training images with the associated cumulative intensity histograms as inputs, at least M+1 regression equations with the intensity percentage thresholds as outputs could be identified with M+1 unknown parameters $b_0$-$b_M$. Therefore, parameters $b_0$-$b_M$ may be solved for.

In step 75, a mean squared error is determined for the intensity-percentage value data of each regression technique applied as a function of the known objective function value, the respective cumulative intensity histogram for each respective image utilized, and the determined parameters $b_0$-$b_M$.

In step 76, the regression technique having the lowest mean square error is identified.

In step 77, a cumulative intensity histogram for the captured image is generated.

In step 78, the cumulative intensity histogram cumh(m, s) and parameters determined from the training session $b_0$-$b_M$ are used to solve for the percentage-based intensity threshold.

In step 79, the intensity threshold is determined based on the correlating percentage-based intensity threshold from the cumulative intensity histogram as shown in FIG. 16.

While certain embodiments of the present invention have been described in detail, those familiar with the art to which this invention relates will recognize various alternative designs and embodiments for practicing the invention as defined by the following claims.

What is claimed is:

1. A method of determining visible regions in a captured image during a nighttime lighting condition, the method comprising the steps of:

capturing an image from an image capture device mounted to a vehicle;

generating an intensity histogram of the captured image;

applying an intensity threshold to the intensity histogram for identifying visible candidate regions of a path of travel, the intensity threshold determined from a training technique that utilizes a plurality of training-based captured images of various scenes, wherein an objective function is used to determine objective function values for each correlating intensity value of each training-based captured image, wherein the objective function values and associated intensity values for each of the training-based captured images are processed for identifying a minimum objective function value and associated optimum intensity threshold for identifying the visible candidate regions of the captured image.

2. The method of claim 1 wherein the optimum intensity threshold is determined by one of a plurality of training techniques, wherein a mean squared error is determined for each optimum intensity threshold determined by each training technique, wherein the optimum intensity threshold associated with the lowest determined mean squared error is selected for identifying the candidate regions in the captured image obtained by the image capture device.

3. The method of claim 2 wherein a fixed intensity threshold technique is applied for determining the optimum intensity threshold, the fixed intensity threshold technique comprises:

summing the objective function values for each correlating intensity value of each training-based captured image;

identifying the minimum objective function value from the summed objective function values;

identifying the intensity threshold associated with the identified minimum objective function value; and applying the identified intensity threshold to the intensity histogram for identifying pixels associated with the candidate regions of the captured image.

4. The method of claim 2 wherein a fixed intensity percentage technique is applied for determining the optimum intensity threshold, the fixed intensity-percentage threshold technique comprises:

determining a cumulative intensity histogram for each training-based captured image;

determining an objective function value for each intensity value in each training-based captured image;

generating a cumulative histogram for each training-based capture image, each cumulative histogram being generated as a function of a percentage of the intensity values in the training-based captured image;

generating an objective function value-percentage-based intensity value correlation graph for each training-based capture image that identifies each percentage-based intensity value in each image to a respective objective function value;

averaging the objective function values for each percentage-based intensity value;

identifying the minimum objective function value from the averaged objective function values;

identifying the respective percentage-based intensity value associated with the minimum objective function value;

identifying the intensity value threshold associated with the identified percentage-based intensity value; and applying the identified intensity threshold to the intensity histogram of the captured image for identifying pixels associated with the candidate regions of the captured image.

5. The method of claim 2 wherein an intensity threshold regression technique is applied for determining the optimum intensity threshold, the intensity threshold regression technique comprises:

generating a cumulative histogram of the captured image;

applying a regression modeling technique for determining the intensity threshold from the cumulative histogram of the captured image;

applying the identified intensity threshold to the intensity histogram for identifying pixels associated with the candidate regions of the captured image.

6. The method of claim 5 wherein the regression modeling technique applied for identifying the intensity threshold includes a least squared regression approach.

7. The method of claim 5 wherein the regression modeling technique applied for identifying the intensity threshold includes a robust regression approach.

8. The method of claim 5 wherein the regression modeling technique applied for identifying the optimum intensity threshold is determined in response to determining a mean squared error for each regression modeling technique as applied to each training-based captured image and in response to identifying the respective regression modeling technique producing a lowest mean square between the compared regression modeling techniques.

9. The method of claim 5 wherein the regression modeling technique includes a linear regression modeling technique and is represented by the following formula:

$$I_{thr\_reg}(s) = a_0 + \sum_{m=1}^{M} a_m \cdot cumh(m, s)$$

wherein $\alpha_0$ is an initial parameter specific to the respective modeling technique determined during the training technique, $a_m$ is parameter specific to the respective modeling technique for a respective bin determined during the training technique, and cumh(m, s) is a cumulative intensity histogram function at Bin m for the training image s.

10. The method of claim 2 wherein a intensity percentage regression technique is applied for determining the intensity threshold, the intensity percentage regression technique comprises:

generating a cumulative histogram of the captured image;

applying a regression modeling technique for determining a percentage-based intensity value;

identifying the intensity threshold associated with the identified percentage-based intensity value;

applying the identified intensity threshold to the intensity histogram for identifying pixels associated with the candidate regions of the captured image.

11. The method of claim 10 wherein the regression modeling technique applied for identifying the intensity threshold includes a least square regression approach.

12. The method of claim 10 wherein the regression modeling technique applied for identifying the intensity threshold includes a robust regression approach.

13. The method of claim 10 wherein the regression modeling technique applied for identifying the intensity threshold is determined in response to determining a mean squared error for each regression modeling technique as applied to each training-based captured image and in response to identifying the respective regression modeling technique producing a lowest mean square error between the compared regression modeling techniques.

14. The method of claim 13 wherein the regression modeling technique is represented by the following formula:

$$I_{thr\_reg}(s) = b_0 + \sum_{m=1}^{M} b_m \cdot cumh(m, s)$$

wherein $b_0$ is an initial parameter specific to the respective modeling technique determined during the training technique, $b_m$ is parameter specific to the respective modeling technique for a respective bin determined during the training technique, and $cumh(m, s)$ is a cumulative intensity histogram function at Bin m for the training image s.

15. The method of claim 1 wherein the objective function is derived from the training technique using observations of sampled nighttime captured images.

16. The method of claim 15 wherein observations include ground-truth labeling used to identify visible and invisible regions of the sampled nighttime images, the ground-truth labeling includes observations relating to a labeled road that is expected to be visible within a region of interest in the sampled nighttime captured images, observations relating to an unlabeled region that are expected to be in an invisible region within the sampled nighttime captured images, and observations relating to an invisible region that are expected to contain no textures within the sampled nighttime captured images.

17. The method of claim 16 wherein the objective function is represented by the following formula:

$$f(x) = w_1 \cdot (1 - rd_{vis}(x)) + w_2 \cdot (1 - unL_{vis}(x)) + w_3 \cdot grdmag_{invis}(x)$$

where x is the intensity threshold of the visible region of interest in one sampled nighttime captured image, $rd_{vis}$ is the ratio of labeled road areas in a visible region of interest in the sampled captured images over a total labeled region in the sampled nighttime captured images, $unL_{vis}$ is the ratio of unlabeled areas classified as being invisible over a total unlabeled region area in the sampled nighttime captured images, $grdmag_{invis}$ is a sum of a gradient magnitude in the invisible region, and w is the weights of each component in the objective function.

18. The method of claim 1 wherein morphological smoothing is applied to the candidate regions to reduce noise and establish a smooth region.

19. The method of claim 1 wherein the application for assisting a driver in determining a path includes a front view camera and an output display device.

20. The method of claim 1 wherein the application for assisting a driver in determining a path includes an object detection sensing system.

21. The method of claim 1 wherein illumination normalization is applied to the captured image for contrasting regions of the image for enhancing image classification.

* * * * *